United States Patent
Bouaru et al.

(10) Patent No.: US 12,370,855 B2
(45) Date of Patent: Jul. 29, 2025

(54) START-UP AND SHUTDOWN FOR ACTIVE SUSPENSION SYSTEM

(71) Applicant: JAGUAR LAND ROVER LIMITED, Warwickshire (GB)

(72) Inventors: Adrian Bouaru, Coventry (GB); Thomas Papanikolaou, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/702,477

(22) PCT Filed: Oct. 18, 2021

(86) PCT No.: PCT/EP2021/078794
§ 371 (c)(1),
(2) Date: Apr. 18, 2024

(87) PCT Pub. No.: WO2023/066445
PCT Pub. Date: Apr. 27, 2023

(65) Prior Publication Data
US 2024/0416705 A1    Dec. 19, 2024

(51) Int. Cl.
*B60G 17/018* (2006.01)

(52) U.S. Cl.
CPC ...... *B60G 17/018* (2013.01); *B60G 2400/204* (2013.01); *B60G 2400/32* (2013.01);
(Continued)

(58) Field of Classification Search
CPC .......... B60G 2400/204; B60G 2800/70; B60G 2800/80; B60G 2600/184;
(Continued)

(56) References Cited

U.S. PATENT DOCUMENTS

| | | | |
|---|---|---|---|
| 7,938,410 B2 | 5/2011 | Buma et al. | |
| 8,234,045 B2 * | 7/2012 | Spadafora | B62D 5/003 701/1 |

(Continued)

FOREIGN PATENT DOCUMENTS

| | | | |
|---|---|---|---|
| DE | 102008005247 | 6/2009 | |
| FR | 2947483 A3 * | 1/2011 | ......... B60G 17/0162 |
| WO | 2018046190 | 3/2018 | |

OTHER PUBLICATIONS

English Translation, DE102008005247 retrieved Dec. 20, 2024 (Year: 2008).*

(Continued)

*Primary Examiner* — Paul N Dickson
*Assistant Examiner* — Caitlin Anne Miller
(74) *Attorney, Agent, or Firm* — Carlson, Gaskey & Olds, P.C.

(57) ABSTRACT

A control system (100, 200) for a vehicle suspension system of a vehicle (900) is disclosed. The control system is configured to: determine that the vehicle is operating in a precondition state in dependence on an actuator power supply status; and output a first damping control signal to an adaptive damping system of the vehicle in dependence on the determination. The first damping control signal is configured to cause the adaptive damping system to activate a first damping control mode in which a predetermined level of damping is provided to the vehicle.

18 Claims, 7 Drawing Sheets

(52) U.S. Cl.
CPC .... *B60G 2500/10* (2013.01); *B60G 2600/182* (2013.01); *B60G 2600/21* (2013.01); *B60G 2800/70* (2013.01); *B60G 2800/80* (2013.01)

(58) Field of Classification Search
CPC ............. B60G 2800/012; B60G 17/06; B60G 17/018; B60G 2202/42
USPC ........................................................ 280/5.5
See application file for complete search history.

(56) References Cited

U.S. PATENT DOCUMENTS

| | | | |
|---|---|---|---|
| 9,174,508 B2 * | 11/2015 | Anderson | B60G 17/016 |
| 9,527,362 B2 * | 12/2016 | Brady | B60G 17/01908 |
| 9,662,954 B2 * | 5/2017 | Brady | B60G 17/016 |
| 9,694,639 B2 * | 7/2017 | Near | H02K 5/12 |
| 9,702,349 B2 * | 7/2017 | Anderson | B60G 17/052 |
| 9,744,825 B2 * | 8/2017 | Schindler | B60G 17/0157 |
| 10,377,371 B2 * | 8/2019 | Anderson | B60G 17/0195 |
| 2023/0086480 A1 * | 3/2023 | Tan | B60G 17/0165 |
| | | | 701/37 |

OTHER PUBLICATIONS

International Search Report and Written Opinion for International Application No. PCT/EP2021/078794 mailed Jul. 8, 2022.

* cited by examiner

START-UP AND SHUTDOWN FOR ACTIVE SUSPENSION SYSTEM

TECHNICAL FIELD

The present disclosure relates to a start-up and shutdown for an active suspension system of a vehicle suspension system. Aspects of the invention relate to a control system, to a system, to a vehicle, to a method, and to computer software.

BACKGROUND

Vehicles (for example petrol, diesel, electric, hybrid) may comprise active suspension systems, such as an electronic active roll control system, for maintaining vehicle stability. Such electronic active roll control systems comprise at least one actuator, the actuator being configured so as to actively impart motor control on the suspension system, the at least one actuator being coupled to a roll bar.

Such active suspension systems may include a number of individual subcomponents or mechatronic subsystems. There may be a high level vehicle control generating a system demand signal, for example a torque demand signal, to influence vehicle motion. There may be a low level controller providing control signals to an actuator (for example to provide motor control) of the active suspension system, to deliver the demanded signal provided. There may be associated mechanical or electromechanical components to deliver a physical manifestation of the demanded signal, for example a motor. There may be a dedicated power supply system. There may be significant interaction between these subsystems in order to provide operation of the active suspension system. Modules forming part of an active suspension system such as an electronic active roll control system should be able to successfully complete their initialization procedures prior to enabling the system and consequently enabling control.

Under certain conditions, dependent on vehicle conditions and user interactions with the vehicle, the initialization checks may complete after the vehicle is in motion. In this condition, the car may be subjected to a lateral accelerations (for example, cornering) with the electronic active roll control system not actively controlling the vehicle roll. If the electronic active roll control system completes its initial checks while the vehicle is in motion and starts controlling the body roll, the system would provide a step input into the vehicle which could be perceived by the driver as an unwanted vehicle behaviour, causing the driver discomfort and potentially causing a vehicle path deviation. A similar problem may be experienced when the vehicle stops if the high level vehicle control demands are requested prior to the vehicle becoming stationary (for example, a step from a control value demand to a zero demand).

Thus, there is a need in the art to be able to
a) enable electronic active roll control while the vehicle is in motion in such a way that it does not cause any user discomfort;
b) disable electronic active roll control when the vehicle comes to a stop in such a way that it does not cause any user discomfort; and
c) enable/disable electronic active roll control while ensuring the vehicle remains in a safe state.

It is an aim of the present invention to address one or more of the disadvantages associated with the prior art.

SUMMARY OF THE INVENTION

Aspects and embodiments of the invention provide a control system for a vehicle suspension system of a vehicle, a system, a vehicle, a method, and computer readable instructions as claimed in the appended claims According to an aspect of the present invention there is provided a control system for a vehicle suspension system of a vehicle, the control system comprising one or more controllers, the control system configured to: determine that the vehicle is operating in a precondition state in dependence on an actuator power supply status; and output a first damping control signal to an adaptive damping system of the vehicle in dependence on the determination; wherein the first damping control signal is configured to cause the adaptive damping system to activate a first damping control mode in which a predetermined level of damping is provided to the vehicle.

According to another aspect of the invention, there is provided a system comprising a control system for a vehicle suspension system in a vehicle; one or more actuators; an actuator power supply configured to supply power to the one or more actuators; an electrical energy storage module connected to the actuator power supply, configured to store the power that is supplied by the actuator power supply to the one or more actuators; and an adaptive damping system configured to provide damping to the vehicle.

According to yet another aspect of the invention, there is provided a vehicle comprising the control system for a vehicle suspension system of a vehicle.

According to a further aspect of the invention, there is provided a method comprising: determining that a vehicle comprising a vehicle suspension system is operating in a precondition state in dependence on an actuator power supply status; and outputting a first damping control signal to an adaptive damping system of the vehicle in dependence on the determination; wherein the first damping control signal is configured to cause the adaptive damping system to activate a first damping control mode in which a predetermined level of damping is provided to the vehicle.

According to a still further aspect of the invention, there is provided computer readable instructions which, when executed by a processor of the control system are arranged to perform the method.

Determining that the vehicle is operating in the precondition state in dependence on the actuator power supply status may comprise one or more of: determining that an electrical energy storage module is connected to the actuator power supply; determining whether the actuator power supply is charged to a predetermined charge threshold; outputting an indication to one or more actuators that the actuator power supply is in operative communication with the electrical energy storage module; and determining that no faults are detected in any component of the vehicle suspension system. "Operative communication" may be understood to mean that the actuator power supply is able to delivery energy to the actuators, i.e. the actuators can receive power from the actuator power. In other words, the actuator power supply is ready for normal operation, including being in operative communication with the electrical energy storage module.

The control system may be configured to, following determination that the vehicle has operated in the precondition state for a predetermined period of time: detect a fault in the vehicle suspension system; in response to detecting the fault, maintain the first damping control mode; and output a switch off signal to the vehicle suspension system, the switch off signal configured to disable the one or more actuators. The predetermined period of time may be considered to be a "start-up" period of time within which the system would be expected to be in a post-precondition operative state. For example, the electrical energy storage module (for example a supercapacitor module) may be expected to have fully charged by the end of the predetermined period of time, disabling the one or more actuators may comprise interrupting power delivery to the suspension system to disable actuator control.

The control system may be configured to, in response to determining that the vehicle has completed operating in the precondition state, output a second damping control signal to the adaptive damping system, the second damping control signal configured to cause the adaptive damping system to deactivate the first damping control mode and activate a second damping control mode. The vehicle may be determined to have completed operating in the precondition state when initialisation checks have completed successfully and no faults are determined to be present.

The control system may be configured to determine that the vehicle has completed operating in the precondition state and receive a signal indicating that the vehicle is in motion: receive a vehicle torque demand to be applied to the one or more actuators, in dependence on the current driving conditions; and output a torque control signal to one or more actuators to cause the one or more actuators to apply the vehicle torque demand The control system may be configured to determine the vehicle torque demand in dependence on the current driving conditions; preferably, wherein the current driving conditions comprise at least one of: driving on a straight road, driving on a curved road, turning a corner, entering or exiting a roundabout, and a speed of the vehicle.

The control system may be configured to, when the second damping control signal is provided, output a first actuation control signal to the one or more actuators, the first actuation control signal configured to cause the one or more actuators to increase a torque level from an initial torque demand to the vehicle torque demand within a predetermined time period. The second damping control signal may be provided when the initialisation checks have completed successfully and no faults are determined to be present in the vehicle suspension system.

The control system may be configured to, when the second damping control signal is provided, when the speed of the vehicle falls below a predefined threshold, output a second actuation control signal to the one or more actuators, the second actuation signal configured to cause the one or more actuators to decrease a torque level from the vehicle torque demand to a torque demand of zero within a predetermined time period. The predetermined time period may be calibratable (i.e. the time period over which the one or more actuators are caused to decrease a torque level from the vehicle torque demand to a torque demand of zero may be calibratable).

The determination that the one or more actuators are electrically connected to the operative actuator power supply in the precondition state is performed independently for each actuator of a vehicle suspension system comprising plural actuators.

The precondition state may comprise initializing one or more other control systems of the vehicle.

The method may further comprise, following determining that the vehicle has operated in the precondition state for a predetermined period of time: detecting a fault in the vehicle suspension system; in response to detecting the fault, maintaining the first damping control mode; and outputting a switch off signal to the vehicle suspension system to disable the one or more actuators.

The method may further comprise, in response to determining that the vehicle has completed operating in the precondition state, outputting a second damping control signal to the adaptive damping system, to cause the adaptive damping system to deactivate the first damping control mode and activate a second damping control mode.

The method may further comprise, following determining that the vehicle has completed operating in the precondition state and receiving a signal indicating that the vehicle is in motion: receiving a vehicle torque demand to be applied to the one or more actuators, in dependence on the current driving conditions; and outputting a torque control signal to one or more actuators to cause the one or more actuators to apply the vehicle torque demand.

The method may further comprise determining the vehicle torque demand in dependence on the current driving conditions.

The method may further comprise, when the second damping control signal is provided, outputting a first actuation control signal to the one or more actuators, the first actuation control signal configured to cause the one or more actuators to increase a torque level from an initial torque demand to the vehicle torque demand within a predetermined time period.

The method may further comprise, when the second damping control signal is provided, and when the speed of the vehicle falls below a predefined threshold, outputting a second actuation control signal to the one or more actuators, the second actuation signal configured to cause the one or more actuators to decrease a torque level from the vehicle torque demand to a torque demand of zero within a predetermined time period.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
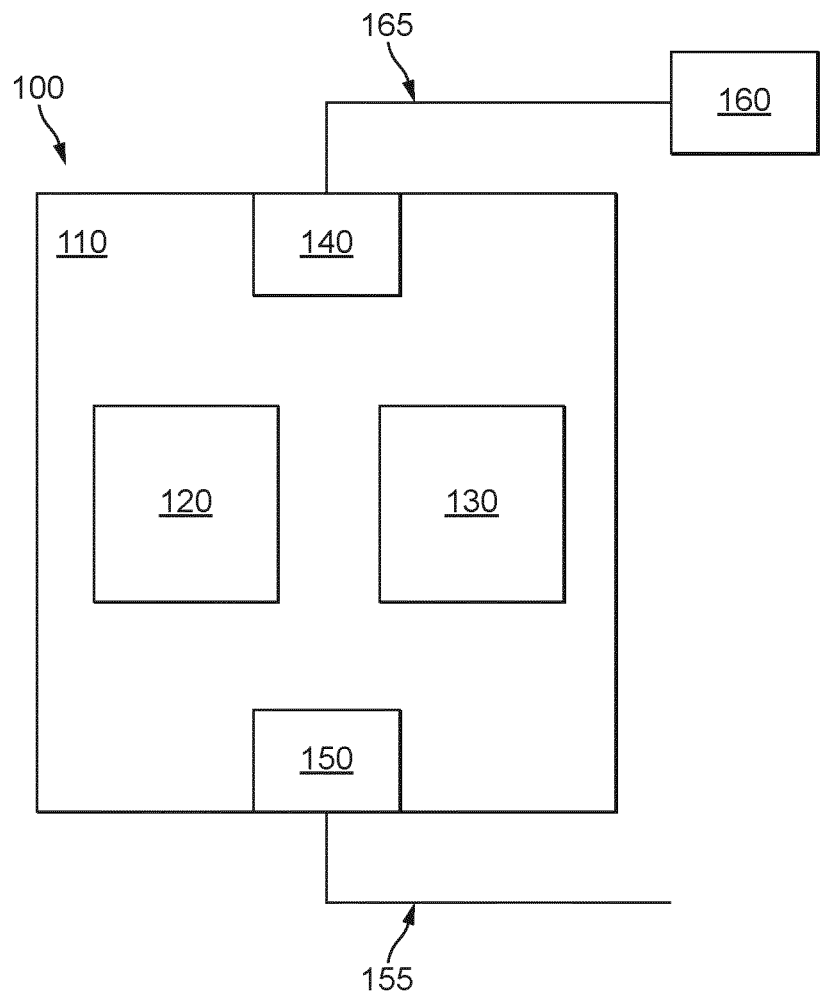
FIG. 1 shows a controller of a control system according to examples disclosed herein.

Active suspension systems, such as electronic active roll control utilizing mechatronic systems, may include a cascade of systems, such as:
- (a) a high level vehicle control layer, which may generate system demand signals (for example torque demands) to influence vehicle motion;
- (b) a low level control layer, which may provide control signals to actuators (for example motor control) to deliver the demanded signal from the high level control; and
- (c) a physical actuation layer, comprising motors and associated mechanical components to deliver the physical manifestation of the demanded signal.

All modules encompassing an electronic active roll control system must be able to successfully complete their initialization procedures prior to enabling the system and consequently enabling control. Under certain conditions, dependent on vehicle conditions and user interactions with the vehicle, the initialization checks may complete after the vehicle is in motion. In this condition, the car may be subjected to a lateral accelerations (for example, cornering) with the electronic active roll control system not actively controlling the vehicle roll. If the electronic active roll control system completes its initial checks while the vehicle is in motion and starts controlling the body roll, the system would provide a step input into the vehicle which could be perceived by the driver as an unwanted vehicle behaviour, causing the driver discomfort and potentially causing a vehicle path deviation. A similar problem may be experienced when the vehicle stops if the high level vehicle control demands are requested prior to the vehicle becoming stationary (for example, a step from a control value demand to a zero demand).

Examples disclosed herein may provide for improvements in start-up and shut down of active suspension systems such as electronic active roll control systems by a) enabling electronic active roll control while the vehicle is in motion in such a way that it does not cause any user discomfort; b) disabling electronic active roll control when the vehicle comes to a stop in such a way that it does not cause any user discomfort; and c) enabling/disabling electronic active roll control while ensuring the vehicle remains in a safe state.

Methods and control systems disclosed herein provide for graceful (for example gradual) introduction of electronic active roll control. When electronic active roll control is disabled (for example waiting for system start-up checks to be completed/vehicle level preconditions not met), the level of electronic active roll control provided is near zero. Once electronic active roll control is enabled, the output demand may mirror the vehicle level request. When electronic active roll control (actuation) control becomes available and is enabled, the initial control demand (zero) may be blended with the vehicle level demand (which may be non-zero) to achieve the vehicle level demand within a certain calibratable time period. The time period over which the one or more actuators are caused to increase a torque level from a (near) zero initial control torque demand to a vehicle level torque demand may be calibratable.

Methods and control systems disclosed herein provide for graceful switching off electronic active roll control when the vehicle comes to a stop. Consider the situation, for example, where a vehicle is in motion: the electronic active roll control system is already actively controlling body roll. When the vehicle becomes stationary (either abruptly or gradually), example, then electronic active roll control is disabled when the vehicle is stationary (or moving at a very low speed). Examples disclosed herein blend the current vehicle level controller with a zero demand to gracefully change the request for electronic active roll control towards a zero demand within a certain calibratable time period (that is, the time period over which the one or more actuators are caused to decrease a torque level from the vehicle torque demand to a torque demand of zero may be calibratable). If an electronic active roll control fault is detected during such processes, the system would priorities safety and enter a safe state.

With reference to FIG. 1, there is illustrated a control system 100 for a vehicle. The control system 100 as illustrated in FIG. 1 comprises one controller 110, although it will be appreciated that this is merely illustrative. The controller 110 comprises processing means 120 and memory means 1130. The processing means 120 may be one or more electronic processing device 120 which operably executes computer-readable instructions. The memory means 130 may be one or more memory device 130. The memory means 130 is electrically coupled to the processing means 120. The memory means 130 is configured to store instructions, and the processing means 120 is configured to access the memory means 130 and execute the instructions stored thereon.

The controller 110 comprises an input means 140 and an output means 150. The input means 140 may comprise an electrical input 140 of the controller 110. The output means 150 may comprise an electrical output 150 of the control system 100. The input 140 is configured to receive one or more input signals 165, for example from a sensor 160. There may be one or more sensors which provide information to the controller input 140. The output 150 is configured to provide one or more output signals 155.

In an example, the control system 100 may be for a suspension system of a vehicle. The control system 100 may also be for a damping system of the vehicle. The control system 100 is configured to determine that the vehicle is operating in a precondition state, in dependence on an actuator power supply status. The output means 150 is arranged to output a first damping control signal 155 to an adaptive damping system of the vehicle on dependence on the determination that the vehicle is operating in a precondition state. The first damping control signal 155 is an electrical signal which is configured to a further vehicle system. By providing the first damping control signal 155, the controller 110 is able to cause an adaptive damping system to activate a first damping control mode in which a predetermined level of damping is provided to the vehicle.

Figure 2A:
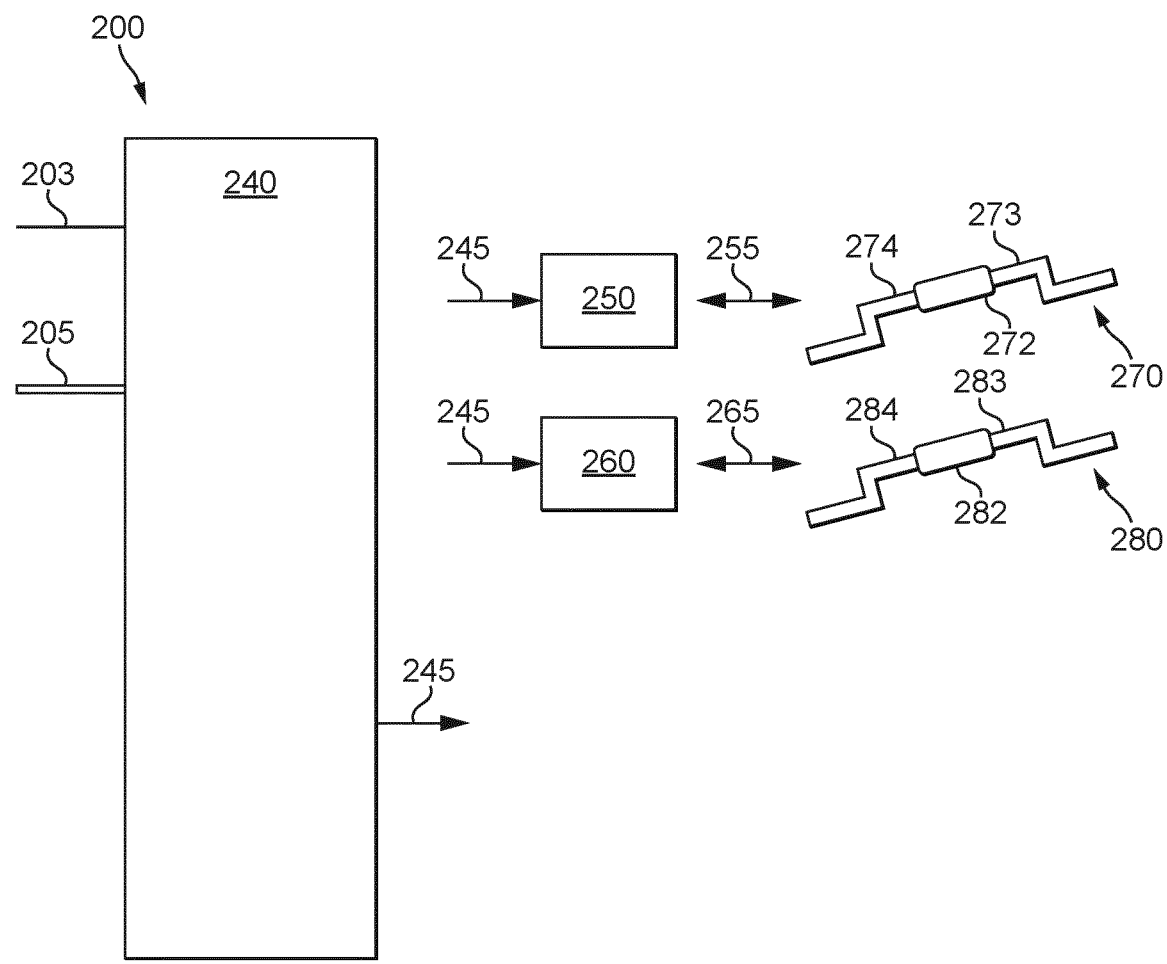
FIG. 2a shows an example control system for a vehicle connected to front and rear anti-roll bars according to examples disclosed herein.
Figure 2B:
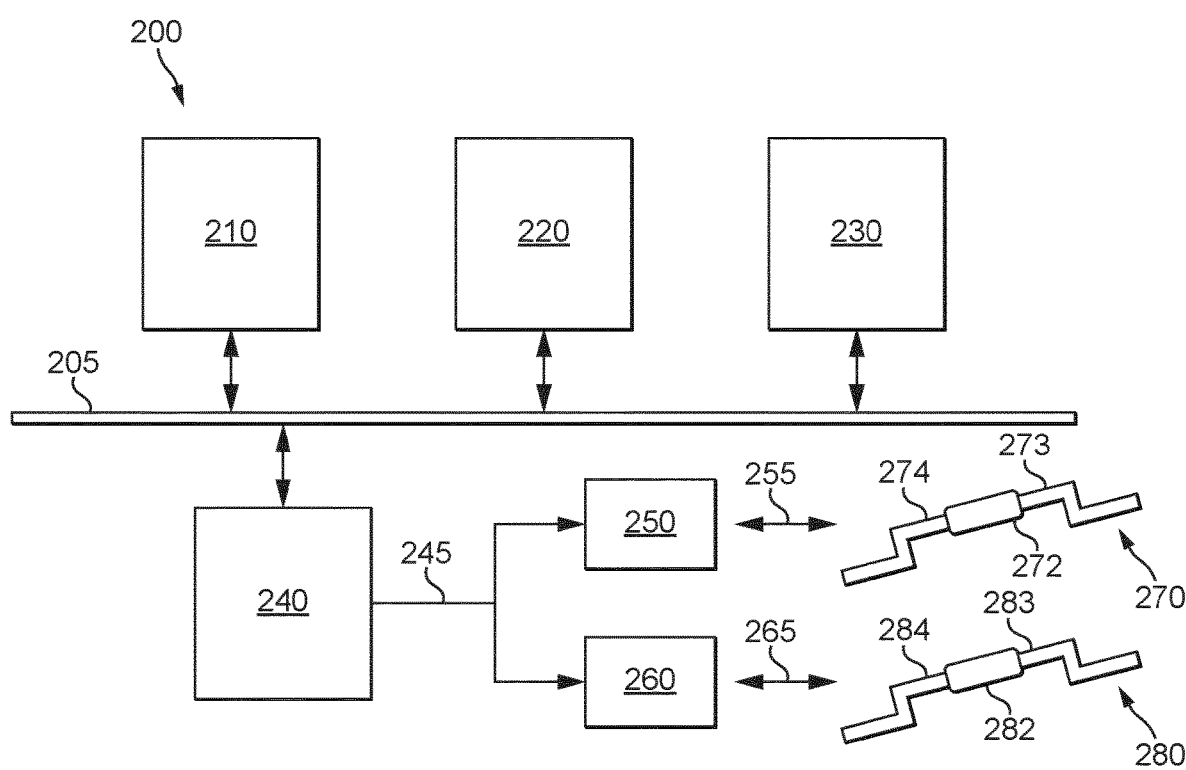
FIG. 2b shows an example control system for a vehicle comprising plural subsystems, and front and rear anti-roll bars, according to examples disclosed herein.

FIGS. 2a and 2b illustrate example control systems 200 for a suspension system of a vehicle. A suspension system of a vehicle may comprise anti-roll bars 270, 280 which are controlled using an anti-roll control system. The anti-roll control system acts to control the anti-roll bars, to control a roll of a body of the vehicle and reduce the impact of disturbances from a road surface. The anti-roll control system may be electromechanical and/or hydraulic. Anti-roll bars 270, 280 may typically comprise stabiliser bars, typically metal, which join the vehicle suspension on either side of the vehicle axle, usually through drop links, and connect to a rotational actuator situated between the mounting points to the vehicle chassis. Each side of the anti-roll bar is able to rotate freely when a motor of the anti-roll control system is not energised. When the motor control is enabled (i.e., delivering torque), the anti-roll bar may act as a torsional spring. The anti-roll bars may be controlled to compensate for some vehicle movements such as body roll, for example from driving around a corner. Body roll can cause the wheels at the side of the vehicle outside the turn to reduce their contact with the road surface. Anti-roll bars may be controlled to counteract this effect and reduce the body roll effect, by transferring at least part of the additional load on the wheels at the side of the vehicle inside the turn to those wheels at the outside, for example by providing a torsional effect to pull the wheels towards the chassis and even out the imbalance in load on the wheels caused by cornering.

A typical suspension system may comprise passive front and rear anti-roll bars provided respectively between the front and rear pairs of wheels of a standard four-wheel vehicle. In a vehicle with an active roll control system, an anti-roll bar 270, 280 may respectively comprise two anti-roll bar ends 273, 283 connected together by a central housing having an actuator. The central housing may additionally have one or more of a gearbox, sensors, and dedicated actuator controllers. The actuator 272, 282 acts to provide an actively controlled torque rather than a fixed torsional stiffness provided by passive anti-roll bars. One or more sensors may monitor the movement of the vehicle, and provide the sensed parameters as input to the active roll control system to control the actuator and provide a suitable torque to the anti-roll bar. The two ends of the anti-roll bar 273, 274; 283, 284 may be identical, or may be non-identical.

FIG. 2a shows an example control system 200 for a suspension system a vehicle, communicatively connected to front and rear anti-roll bars 270, 280. The control system 200 comprises a controller 240 which is connected by a communication channel 245 to anti-roll bar controllers 250, 260 configured to respectively control front and rear anti-roll actuators 272, 282. The controller 240 may be the controller 110 of FIG. 1. The controller 240 may comprise one or more of the controllers 110 of FIG. 1. In an example, the controller 240 may be a master controller for an electronic active roll control system in the vehicle. The controller 240 may host a vehicle level control strategy and actuation control for the electronic active roll control system in the vehicle.

The controller 240 may be configured to receive one or more sensor signal 203 from one or more sensors attached to the vehicle. The one or more sensors signals 203 may comprise, for example, a signal from a a respective suspension height sensor of the vehicle suspension; a signal from a respective hub acceleration sensor of the vehicle; and a signal from a respective torque sensor for the anti-roll bar actuators 272, 282. A signal from a respective motor position sensor for the anti-roll bar actuators 272, 282 may be communicated to the controller 240 via the communication link 245. A suspension height sensor may be configured to determine a sensor signal indicative of one or more of a height of a left side and a height of a right side of the vehicle suspension. A motor position sensor may be configured to determine a sensor signal indicative of a position of a respective motor of the anti-roll bar actuators 272, 282. A hub acceleration sensor may be configured to determine a sensor signal indicative of an acceleration of one or more hub of a wheel of the vehicle. A torque sensor may provide a measure of an existing torque generated in the system, as a result of a target torque demand being requested by the controller 240.

The controller 240 may be configured to receive one or more communication signals via a communications bus 205. The communications bus 205 may be configured to deliver data to the controller 240 from other subsystems within the vehicle. For example, the communications bus 205 may be configured to communicate a signal indicating a status of one or more modules 210, 220, 230 that are in communicative connection with the controller 240 to the controller 240. In another example, the communications bus 205 may be configured to communicate a command from the controller 240 to the one or more modules 210, 220, 230 that are in communicative connection with the controller 240. The one or more modules 210, 220, 230, are discussed further in relation to FIG. 2b below. Signals transmitted over connections 203 or 245 may alternatively or additionally be transmitted over communications bus 205.

The controller 240 may be configured to generate system demand signals to influence a vehicle's motion via the anti-roll actuators 272, 282. An actuator provided between a front pair of wheels of a vehicle may be called a front actuator. A front active roll control (FARC) module may be electrically connected to the front actuator, and may comprise the controller 250 to control the front actuator 272. Similarly, an actuator provided between a rear pair of wheels of a vehicle may be called a rear actuator. A rear active roll control (RARC) module may be electrically connected to the rear actuator and may comprise a controller 260 to control the rear actuator 282.

The front and rear anti-roll actuators 272, 282 each comprise an electric motor which is controllable by the respective anti-roll controller 250, 260. Each of the front and rear anti-roll actuators 272, 282 may be controlled by its own respective anti-roll controller in some examples, or multiple anti-roll actuators may be controlled by a common anti-roll controller in some examples. Each of the anti-roll actuators 272, 282 may be individually controlled in some cases to improve the management of the roll of the body of the vehicle. The front and rear anti-roll actuators 272, 282 may be controlled by a control signal which is generated by the controller 240 may generate and output, through the output channel 255, 265, to the anti-roll bar controllers 250, 260, which then use the communication channel 245 to exchange data with the controller 240. The control signal may carry instructions to be implemented by the actuator, for example by providing a torque to apply to the anti-roll bar. For example, as discussed above, when the vehicle is cornering, a control signal may be transmitted to the anti-roll bar controllers 250, 260, which may in turn transmit a control signal via the interface 255, 265, so that the front and rear anti-roll actuators 272, 282 may mitigate a body roll effect. Similarly, anti-roll bar controllers 250, 260 may transmit measured values from the anti-roll actuators to the controller 240 through output channel 245.

FIG. 2b shows an example control system 200 for a vehicle comprising one or more modules 210, 220, 230, a controller 240 and front and rear anti-roll bars 270, 280. As in FIG. 2a, the control system 200 comprises a controller 240 which is connected by a communication channel 245 to controllers 250, 260 configured to respectively control front and rear anti-roll bar actuators 272, 282. Further, the controller 240 of the control system 200 is in a communicative connection to the one or more modules 210, 220, 230 via a communications bus 205. The one or more modules 210, 220, 230 may be configured to perform functions relating to power supply of the suspension system. Module 210 may be a power control module configured to control a power supply system for the suspension system. Module 220 may be a conversion module configured to convert electrical energy output from a vehicle power supply system. In an example, the conversion module 220 may comprise a DC-DC converter. Module 230 may be a capacitor or supercapacitor module configured to store electrical energy for the suspension system. Together, conversion module 220 and capacitor module 230 may be configured to supply electrical energy to the controllers 250, 260, such that the anti-roll bar actuators 272, 282 can be actuated. FIG. 2*b* illustrates these modules 210, 220, 230 as individual modules. However, there may be examples whereby components within the modules 210, 220, and 230 are included in a single module.

Figure 3:
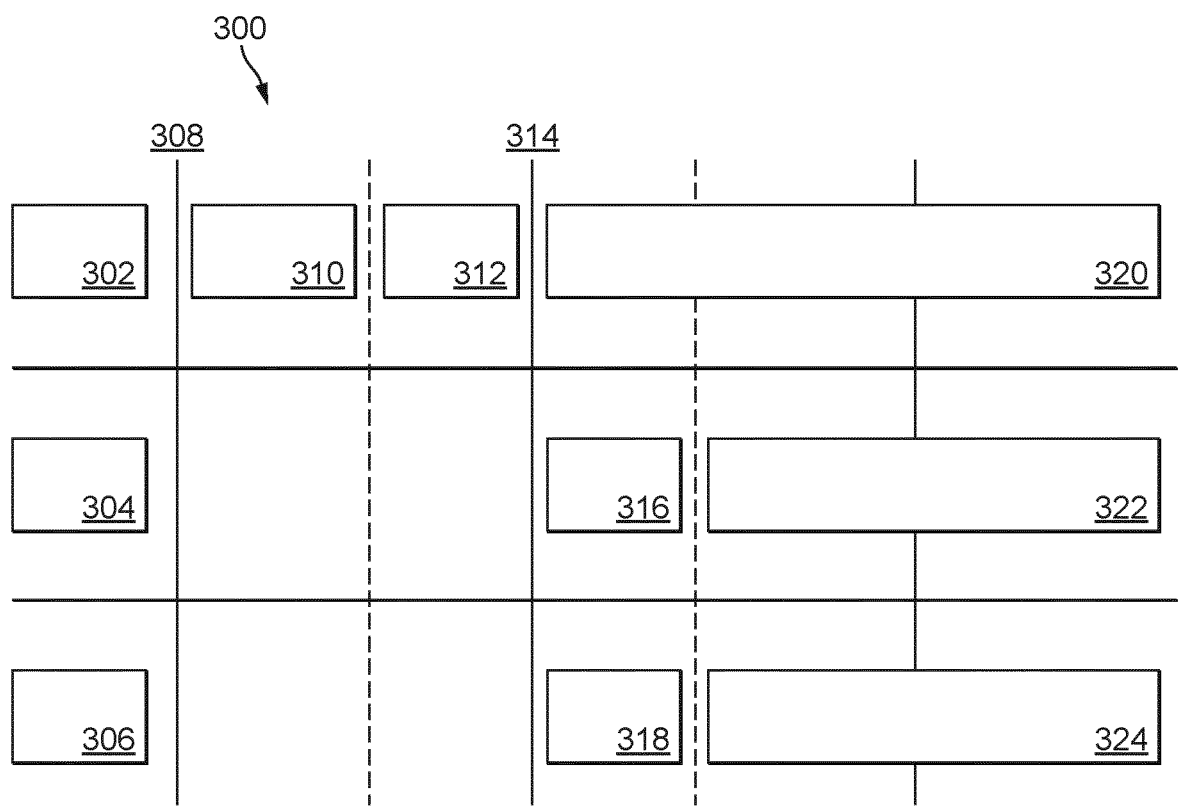
FIG. 3 shows a method according to examples disclosed herein.

FIG. 3 illustrates an example flow diagram 300 showing a start-up procedure of a vehicle. The control system 200 is comprised of several control modules and mechatronic components. These may include an actuator power supply controller 302; an actuator power supply; an electrical energy storage module; front and rear actuator control modules 304; a master controller 306; and front and rear actuators 272, 282. The master controller 306 may be configured to host 324 a vehicle level control strategy and supervisory actuation control for the control system 200. The actuator power supply controller 302 may be configured to host supervisory control for the actuator power supply. The actuator power supply may be configured to provide power to the front and rear actuators, in combination with the electrical energy storage module. The front and rear actuator control modules 304 may be configured to control the front and rear actuators 272, 282 and to host low level motor control. The front and rear actuators 272, 282 may include an active anti-roll bar unit and may be configured to host an electronic active roll control motor, and other associated mechatronic components.

When the vehicle is unlocked 308 or otherwise interacted with to signal an intention to operate/drive the vehicle, one or more of the control modules, such as the actuator power supply controller 302, the actuator power supply, and the electrical energy storage module, may be initialised 310. Other control modules, such as the master controller 306, and the front and rear actuator control modules 304, may be initialised 318, 316 when a vehicle ignition is turned on 314. For example, an initialization time for the control modules may be one second or less.

When the actuator power supply controller 302 is initialised, an electrical energy storage module may be pre-charged 312 to a target threshold.

When the control modules are initialized, an electronic active roll control system start-up procedure begins. This start-up procedure verifies whether the front and rear actuators 272, 282 are operatively electrically connected. The start-up procedure may be performed when the engine of the vehicle is running.

The start-up procedure may include a plurality of preconditions. The preconditions may include: determining that the electrical energy storage module is connected to the actuator power supply; determining that the electrical energy storage module connected to the actuator power supply is charged to at least a predetermined threshold that is required for electronic active roll control; determining that the master controller 306 has indicated to the front and rear actuator control modules that the actuator power supply is ready for operation; and determining that there are no faults in any of the components of the control system 200.

For example, when determining that the actuator power supply is ready for operation, it may be determined that the electrical energy storage module is connected to the actuator power supply and is charged to at least a predetermined threshold (for example, determining that charge accumulated in the electrical energy storage module has reached the predetermined threshold).

The start-up procedure may be performed independently for both front and rear actuator control modules. The start-up procedure may only be performed when the master controller has provided an indication that the actuator power supply is ready for operation. When the start-up procedure has been successfully completed, the electronic active roll control may begin 322.

However, if the vehicle is unused for a long period of time (for example, 20 days, 30 days, 41 days, or more), the charge held by the electrical energy storage module may drop below the predetermined threshold. Therefore, when the vehicle is next turned on and the start-up procedure is performed, it may be determined that the electrical energy storage module is not charged to the predetermined threshold and must therefore be charged to the predetermined threshold. This will take more time than if the electrical energy storage module was already charged to the predetermined threshold. While the electrical energy storage module is charging, the electronic active roll control will remain unavailable. This means that the electronic active roll control may be unavailable while the vehicle is in motion. When the electrical energy storage module is charged to the predetermined threshold, the actuator power supply controller 302 may maintain 320 the charge at the predetermined threshold by charging and discharging the electrical energy storage as needed.

To increase vehicle stability while the electrical energy storage module is charging to the predetermined threshold, an interaction with a damping system (for example, an adaptive damping system) of the vehicle may be introduced. For the duration that the electrical energy storage module is being charged, the damping system of the vehicle is configured to apply a predetermined level of damping to the vehicle. For example, the damping system may be configured to apply a firm level of damping to the vehicle. The applied predetermined level of damping increases vehicle stability.

When the electrical energy storage module has reached the predetermined threshold of charge, the damping system ceases to apply the predetermined level of damping and electronic active roll control begins.

If a fault in the control system 200 is detected during or immediately after the charging of the electrical energy storage module, the predetermined level of damping applied by the damping system is maintained to help to ensure vehicle stability.

When the start-up procedure is completed and electronic active roll control begins, torque will be applied to the front and rear actuators 272, 282 in dependence on the electronic active roll control torque target and a vehicle level torque request. The vehicle level torque request may be dependent on a vehicle use case. For example, whether the vehicle is driving on a straight road, is turning a corner, or is entering or exiting a roundabout.

If the vehicle level torque request would be the same as the electronic active roll control target at the point of the electronic active roll control starting, a step input may be provided in the torque delivered to the front and rear actuators 272, 282. For example, the torque applied to the front and rear actuators 272, 282 may change very quickly from a low or zero level to the vehicle level request. This may cause vehicle handling and user comfort problems because the vehicle may suddenly begin to move due to the increase in torque. To mitigate this problem, when the electronic active roll control becomes available (i.e., when the start-up procedure is completed and the power supply is ready for operation) the torque applied to the front and rear actuators 272, 282 is blended from the initial torque demand (for example, a zero torque demand) to the vehicle level torque demand (which may not be zero) within a calibratable time period.

Figure 4:
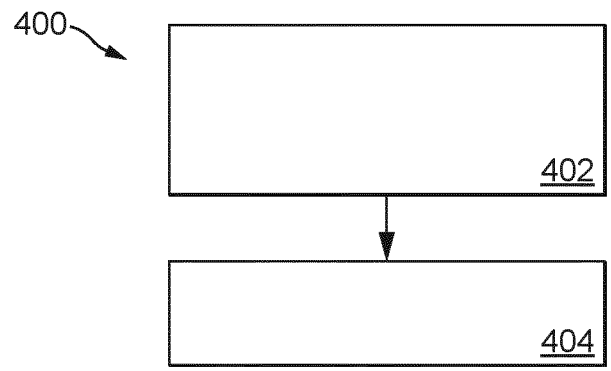
FIG. 4 shows a method according to examples disclosed herein.

FIG. 4 shows an example of a method 400 for a control system 240 for a vehicle suspension system of a vehicle. The control system 240 is configured to determine 402 that the vehicle is operating in a precondition state in dependent on an actuator power supply status. For example, when the control modules of the control system 240 have initialised and the vehicle is unlocked and the vehicle ignition is on, the vehicle may enter a precondition state in which a plurality of checks may be carried out to ensure the vehicle is ready to drive.

In dependence on the determination that the vehicle is operating in a precondition state, the control system 240 is configured to output 404 a first damping control signal to an adaptive damping system of the vehicle. The precondition state may comprise initializing one or more other control systems of the vehicle. That is, when the vehicle is in a precondition state it may be the case that a suspension system of the vehicle (for example, the electronic active roll control system) is not operational; if this is the case, additional damping may be applied to the vehicle by the damping system to ensure vehicle stability.

The first damping control signal is configured to cause the adaptive damping system to activate a first damping control mode in which a predetermined level of damping is provided to the vehicle. The predetermined level of damping may be a firm state. The predetermined level of damping may be configured to increase the stability of the vehicle. The predetermined level of damping may be calibratable. The predetermined level of damping may be applied to ensure the vehicle is stable while the vehicle suspension is unavailable.

Figure 5:
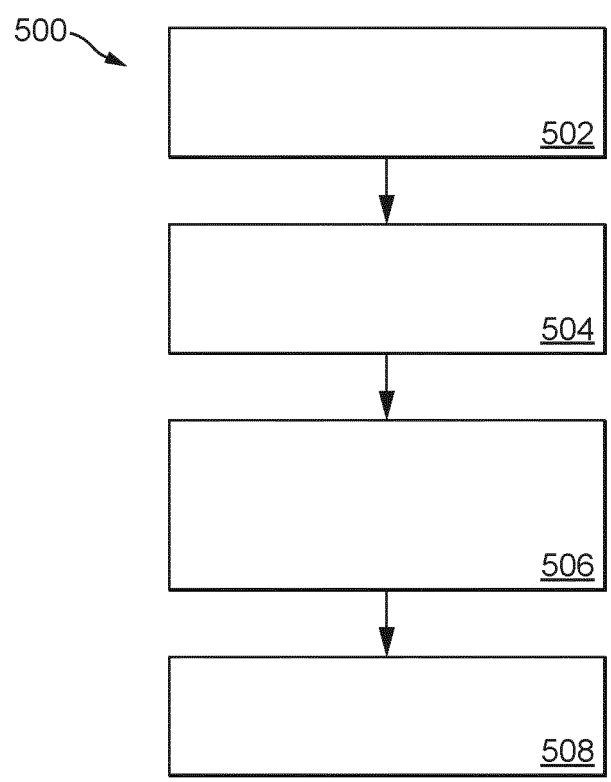
FIG. 5 shows a method according to examples disclosed herein.

FIG. 5 shows an example of a method 500 for a control system 240 for a vehicle suspension system of a vehicle. The control system 240 may be configured to perform one or more initialization procedures when determining that the vehicle is operating in the precondition state in dependence on the actuator power supply status.

Determining that the vehicle is operating in the precondition state in dependence on the actuator power supply status may include one or more of: determining 502 that an electrical energy storage module is connected to the actuator power supply; determining 504 whether the actuator power supply is charged to a predetermined charge threshold; outputting 506 an indication to one or more actuators (for example, to the front and rear anti-roll bar actuators 272, 282) that the actuator power supply is in operative communication with the electrical energy storage module (i.e. the electrical energy storage module is able to delivery energy to the actuators; the power supply is ready for operation); and determining 508 that no faults are detected in any component of the vehicle suspension system. That is, the precondition state may include determining that the actuators are operatively connected to an actuator power supply that is sufficiently charged 'to allow the actuators to function as well as checking that all components of the vehicle suspension system are functional.

For example, if the vehicle has been unused for a long period of time (for example, a period of time greater than 41 days) a charge held by the actuator power supply may drop to a low level and therefore it may be necessary to charge the actuator power supply while the vehicle is in motion. In this case, it would be determined that the actuator power supply is not charged to a predetermined charge threshold and therefore that the vehicle is operating in the precondition state. In this case, the control system 240 may be configured to output a switch off signal to the vehicle suspension system. The switch off signal is an electrical signal configured to disable the one or more actuators. For example, the switch off signal may interrupt power delivery to the vehicle suspension system and disable actuator control. In this example, the first damping control mode may remain activated until the actuator power supply is charged to the predetermined charge threshold. When the actuator power supply is charged to the predetermined charge threshold, the first damping control mode may be deactivated and the vehicle suspension system may operate normally.

The determination that the one or more actuators are electrically connected to the operative actuator power supply in the precondition state may be performed independently for each actuator of a vehicle suspension system comprising plural actuators. For example, controllers 250, 260 may each independently perform the determination for the front and rear anti-roll bar actuators 272, 282, respectively.

Figure 6:
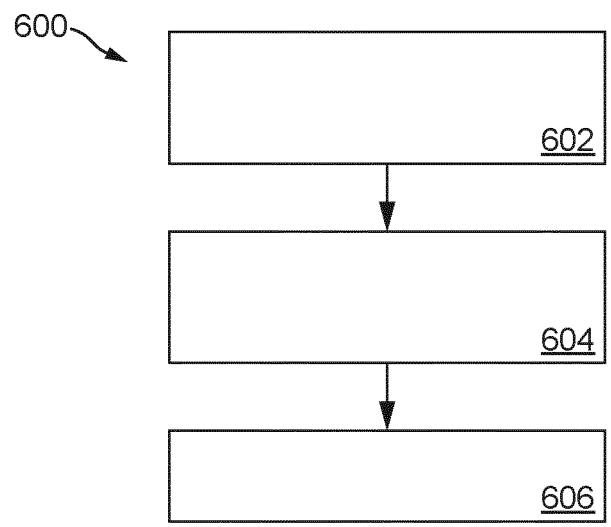
FIG. 6 shows a method according to examples disclosed herein.

FIG. 6 shows an example of a method 600 for a control system 240 for a vehicle suspension system of a vehicle. In this example, the control system 240 is configured to detect 602 a fault in a vehicle suspension system. For example, it may be detected the actuator power supply failed to charge to the predetermined threshold within a predetermined time period. It may thus be determined that there is a fault in the vehicle suspension system. In response to detecting the fault in the vehicle suspension, the control system 240 is configured to maintain 604 the first damping control mode. The control system 240 is configured to output 606 a switch off signal to the vehicle suspension system. The switch off signal is an electrical signal configured to disable the one or more actuators.

Further to the above example, if the fault is detected in the vehicle suspension system, the vehicle suspension system (including the actuators) may be switched off and, to ensure the vehicle is stable, additional damping may be applied to the vehicle. In this case, the vehicle suspension system may be disabled until a new drive cycle is started (i.e., normal operation of the vehicle suspension system may not resume during a current drive cycle).

Figure 7:
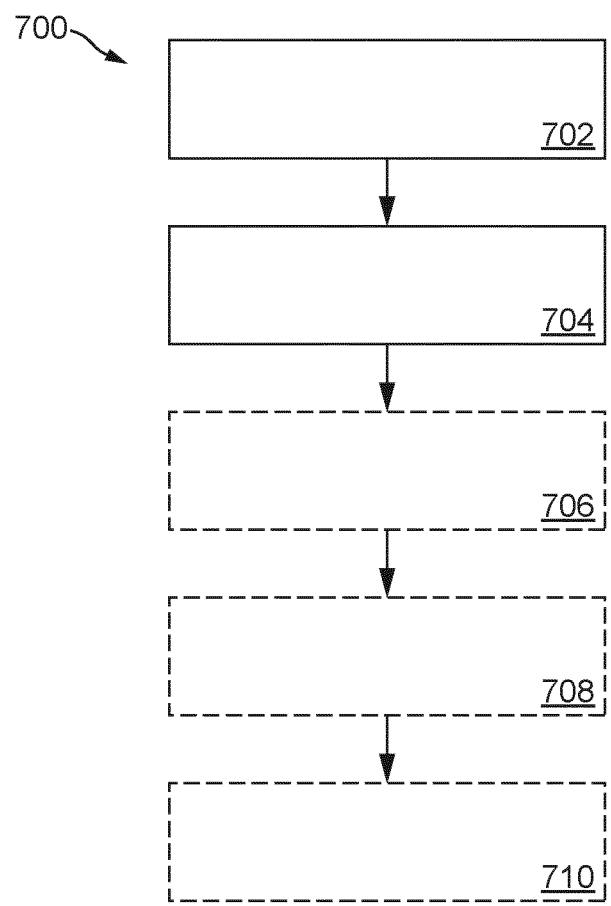
FIG. 7 shows a method according to examples disclosed herein.

FIG. 7 shows an example of a method 700 for a control system 240 for a vehicle suspension system of a vehicle. In this example, in response to determining 702 that the vehicle has completed operating in the precondition state, the control system 240 is configured to output 704 a second damping control signal to the adaptive damping system. The second damping control signal is an electrical signal configured to cause the adaptive damping system to deactivate the first damping control mode and activate a second damping control mode. That is, when it is determined that the power supply is ready for operation in order (for example, the actuators are operatively connected to an actuator power supply that is sufficiently charged) to allow the actuators to function as well as checking that all components of the vehicle suspension system are functional, a signal may be output to the damping system, instructing it to release the additional damping.

In a further example, the control system 240 may be further configured to receive 706 a signal indicating that the vehicle is in motion. The signal indicating that the vehicle is in motion may be received from a further control system of the vehicle. The control system may then receive 708 a vehicle torque demand to be applied to the one or more actuators, in dependence on current driving conditions. For example, when it is determined that the vehicle suspension system is fully operational as discussed with regard to FIG. 5, and it is determined that the vehicle is in motion, torque may be applied to the actuators according to a vehicle torque demand, where the vehicle torque demand is dependent on current driving conditions.

The current driving conditions may comprise at least one of: driving on a straight road, driving on a curved road, turning a corner, entering or exiting a roundabout, and a speed of the vehicle. The control system may output 710 a torque control signal to one or more actuators (for example, the anti-roll control actuators 272, 282). The torque control signal is an electrical signal configured to cause the one or more actuators to apply the vehicle torque demand.

Further to this example, when the second damping control signal is provided, the control system 240 may be configured to output a first actuation control signal to the one or more actuators. The first actuation control signal may be an electrical signal configured to cause the one or more actuators to increase a torque level from an initial torque demand to the vehicle torque demand within a predetermined time period. The initial torque demand may be a torque demand of zero.

For example, when the vehicle suspension system is switched on and a vehicle torque demand is received, a sudden application of this torque level to the actuators may cause vehicle handling problem and user discomfort. To mitigate this problem, a smooth transition from an initial torque level of zero to the vehicle level torque demand by controlling the rate of change of torque, ramping the applied torque over a predetermined time period.

Further to this example, when the second damping control signal is provided (i.e. the active damping system is operating in a normal operation mode), when the speed of the vehicle falls below a predefined threshold, the control system 240 may be configured to output a second actuation control signal to the one or more actuators (for example, the anti-roll control actuators 272, 282). The second actuation control signal may be an electrical signal configured to cause the one or more actuators to decrease a torque level from the vehicle torque demand to a torque demand of zero within a predetermined time period. Provision of the second actuation control signal may also take place even if there are no faults detected as being present in the vehicle suspension system, or the active damping system, as the condition triggering the second actuation control signal provision is the decrease in speed.

For example, if the vehicle speed has fallen to a low level or the vehicle is coming to a stop, the vehicle suspension system may no longer be needed. In this case, to ensure a smooth transition to the vehicle suspension system no longer being used, a torque level being applied to the actuators may be ramped to a torque level of zero by controlling the rate of change of torque over the predetermined time period, rather than the actuators being suddenly switched off.

Figure 8:
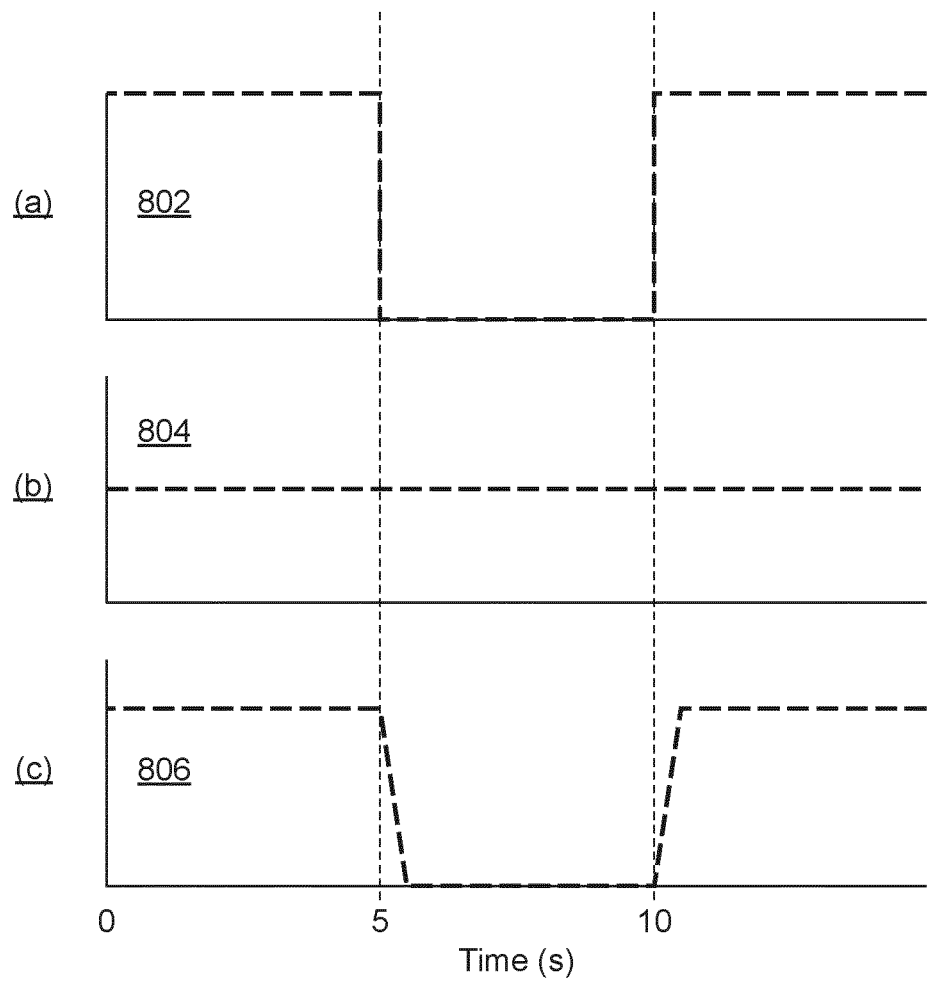
FIG. 8 shows example progression of control status, vehicle torque demand, and an applied torque value over time according to examples disclosed herein.

FIG. 8 illustrates an example of graphs showing the progression of control status 802, vehicle torque demand 804, and an actuator torque demand value 806 over time. Graph (a) 802 illustrates a controller of the anti-roll bar actuators 272, 282 turning on and off. For example, the controller is turned on from 0 seconds to 5 seconds; between 5 seconds to 10 seconds the controller is turned off and control of the anti-roll bar actuators is disabled; and at 10 seconds control of the anti-roll bar actuators is enabled and the controller is turned on. Of course, other time intervals may be used in other examples. For example, the controller may be turned off in the event that it is determined that there is a fault detected within any component the vehicle suspension system or, in another example, if an actuator power of the anti-roll bar actuators 272, 282 is not charged to a predetermined charge threshold.

Graph (b) 804 illustrates a vehicle torque demand over time. For example, although the controller of the anti-roll bar actuators 272, 282 may be turned off, the vehicle torque demand does not change and may have a non-zero value. Graph (c) 806 illustrates an applied torque over time. For example, when the controller of the anti-roll bar actuators 272, 282 is turned off, no torque is applied to the actuators 272, 282. Additionally, it can be seen that the applied torque is not turned off as a binary on/off but is rather ramped such that a smooth transition between a vehicle torque demand and a zero torque demand and vice versa is provided. In the event that the anti-roll bar actuators 272, 282 are disabled, it may be necessary to apply a predetermined level of damping to the vehicle, as discussed with regard to FIG. 4.

Figure 9:
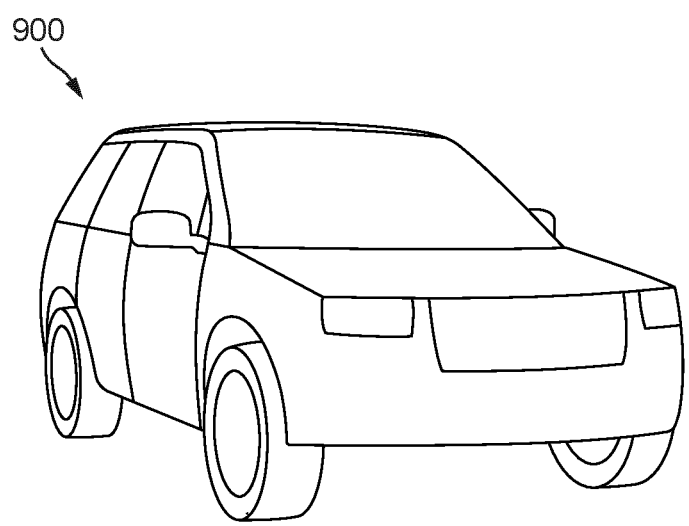
FIG. 9 shows a vehicle according to examples disclosed herein.

FIG. 9 shows an example vehicle 900 that may comprise the control system for a vehicle suspension system in a vehicle according to any of the examples disclosed herein. The vehicle 900 in the present embodiment is an automobile, such as a wheeled vehicle, but it will be understood that the control system and active suspension system may be used in other types of vehicle.

As used here, 'connected' means 'electrically interconnected' either directly or indirectly. Electrical interconnection does not have to be galvanic. Where the control system is concerned, connected means operably coupled to the extent that messages are transmitted and received via the appropriate communication means.

It will be appreciated that various changes and modifications can be made to the present invention without departing from the scope of the present application. Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle suspension system of a vehicle, the control system comprising one or more controllers, the control system configured to:
   determine that the vehicle is operating in a precondition state in dependence on an actuator power supply status; and
   output a first damping control signal to an adaptive damping system of the vehicle in dependence on the determination;
   wherein the first damping control signal is configured to cause the adaptive damping system to activate a first damping control mode in which a predetermined level of damping is provided to the vehicle, and
   wherein the precondition state includes at least one or more of:
      determining that an electrical energy storage module is connected to the actuator power supply;
      determining whether the actuator power supply is charged to a predetermined charge threshold;

outputting an indication to one or more actuators that the actuator power supply is in operative communication with the electrical energy storage module; and
determining that no faults are detected in any component of the vehicle suspension system.

2. The control system of claim 1, wherein the control system is configured to, following determination that the vehicle has operated in the precondition state for a predetermined period of time:
detect a fault in the vehicle suspension system;
in response to detecting the fault, maintain the first damping control mode; and
output a switch off signal to the vehicle suspension system, the switch off signal configured to disable the one or more actuators.

3. The control system of claim 1, wherein the control system is configured to:
in response to determining that the vehicle has completed operating in the precondition state, output a second damping control signal to the adaptive damping system, the second damping control signal configured to cause the adaptive damping system to deactivate the first damping control mode and activate a second damping control mode.

4. The control system of claim 3, wherein the control system is configured to:
determine that the vehicle has completed operating in the precondition state and receive a signal indicating that the vehicle is in motion:
receive a vehicle torque demand to be applied to the one or more actuators, in dependence on the current driving conditions; and
output a torque control signal to one or more actuators to cause the one or more actuators to apply the vehicle torque demand.

5. The control system of claim 4, wherein the control system is configured to:
determine the vehicle torque demand in dependence on the current driving conditions;
preferably, wherein the current driving conditions comprise at least one of: driving on a straight road, driving on a curved road, turning a corner, entering or exiting a roundabout, and a speed of the vehicle.

6. The control system of claim 4, wherein the control system is configured to, when the second damping control signal is provided, output a first actuation control signal to the one or more actuators, the first actuation control signal configured to cause the one or more actuators to increase a torque level from an initial torque demand to the vehicle torque demand within a predetermined time period.

7. The control system of claim 6, wherein the predetermined time period is calibratable.

8. The control system of claim 4, wherein the control system is configured to, when the second damping control signal is provided, when the speed of the vehicle falls below a predefined threshold, output a second actuation control signal to the one or more actuators, the second actuation signal configured to cause the one or more actuators to decrease a torque level from the vehicle torque demand to a torque demand of zero within a predetermined time period.

9. The control system of claim 1, wherein the determination that the one or more actuators are electrically connected to the operative actuator power supply in the precondition state is performed independently for each actuator of a vehicle suspension system comprising plural actuators.

10. The control system of claim 1, wherein the precondition state comprises initializing one or more other control systems of the vehicle.

11. A system, comprising:
a control system for a vehicle suspension according to claim 1;
one or more actuators;
an actuator power supply configured to supply power to the one or more actuators;
an electrical energy storage module connected to the actuator power supply, configured to store the power that is supplied by the actuator power supply to the one or more actuators; and
an adaptive damping system configured to provide damping to the vehicle.

12. A vehicle comprising a control system according to claim 1.

13. The control system of claim 1, wherein the precondition state at least includes the determining that the electrical energy storage module is connected to the actuator power supply.

14. The control system of claim 1, wherein the precondition state at least includes the determining whether the actuator power supply is charged to the predetermined charge threshold.

15. The control system of claim 1, wherein the precondition state at least includes the outputting the indication to the one or more actuators that the actuator power supply is in operative communication with the electrical energy storage module.

16. The control system of claim 1, wherein the precondition state at least includes the determining that no faults are detected in any component of the vehicle suspension system.

17. A method, comprising:
determining that a vehicle comprising a vehicle suspension system is operating in a precondition state in dependence on an actuator power supply status; and
outputting a first damping control signal to an adaptive damping system of the vehicle in dependence on the determination;
wherein the first damping control signal is configured to cause the adaptive damping system to activate a first damping control mode in which a predetermined level of damping is provided to the vehicle, and
wherein the precondition state includes at least one or more of:
determining that an electrical energy storage module is connected to the actuator power supply;
determining whether the actuator power supply is charged to a predetermined charge threshold;
outputting an indication to one or more actuators that the actuator power supply is in operative communication with the electrical energy storage module; and
determining that no faults are detected in any component of the vehicle suspension system.

18. Computer readable instructions are operable to cause a control system to execute the steps of the method according to claim 17.

* * * * *